United States Patent
Kim et al.

(10) Patent No.: US 9,224,348 B2
(45) Date of Patent: Dec. 29, 2015

(54) LIQUID CRYSTAL DISPLAY

(75) Inventors: Hongjae Kim, Goyang-si (KR); Pyunghun Kim, Gumi-si (KR)

(73) Assignee: LG DISPLAY CO., LTD., Seoul (KR)

( * ) Notice: Subject to any disclaimer, the term of this patent is extended or adjusted under 35 U.S.C. 154(b) by 1061 days.

(21) Appl. No.: 12/970,349

(22) Filed: Dec. 16, 2010

(65) Prior Publication Data

US 2012/0026151 A1    Feb. 2, 2012

(30) Foreign Application Priority Data

Jul. 27, 2010 (KR) .................. 10-2010-0072333

(51) Int. Cl.
*G09G 5/00* (2006.01)
*G09G 3/36* (2006.01)
*G02F 1/1362* (2006.01)

(52) U.S. Cl.
CPC ............ *G09G 3/3614* (2013.01); *G09G 3/3648* (2013.01); *G02F 1/136286* (2013.01); *G09G 2300/0426* (2013.01); *G09G 2300/0443* (2013.01); *G09G 2310/0251* (2013.01); *G09G 2330/021* (2013.01)

(58) Field of Classification Search
CPC .............. G09G 2300/0426; G09G 3/3614; G09G 2300/0443; G09G 2310/0251; G09G 2330/021; G09G 3/3648; G02F 1/136286
USPC .................................... 345/87–212
See application file for complete search history.

(56) References Cited

U.S. PATENT DOCUMENTS

| 7,548,288 B2* | 6/2009 | Kim et al. ................ 349/84 |
| 2006/0081850 A1* | 4/2006 | Lee et al. ................ 257/72 |
| 2008/0079678 A1* | 4/2008 | Cho et al. ................ 345/88 |
| 2010/0265238 A1* | 10/2010 | Lee et al. .............. 345/211 |

FOREIGN PATENT DOCUMENTS

| CN | 1746757 | 3/2006 |
| CN | 1755444 A | 4/2006 |
| CN | 101154361 A | 4/2008 |

OTHER PUBLICATIONS

Office Action issued in corresponding Chinese Patent Application No. 201010606073.7, mailed Sep. 17, 2013, 9 pages.
Office Action issued in corresponding Chinese Patent Application No. 201010606073.7, mailed Feb. 5, 2013.

* cited by examiner

*Primary Examiner* — Kumar Patel
*Assistant Examiner* — Insa Sadio
(74) *Attorney, Agent, or Firm* — Brinks Gilson & Lione

(57) ABSTRACT

A liquid crystal display is disclosed. The liquid crystal display includes a data driving circuit, that converts digital video data into positive and negative data voltages, supplies the positive and negative data voltages to data lines of a liquid crystal display panel, and causes the data voltages supplied to the same data line to have the same polarity during one frame period, and a gate driving circuit sequentially supplying a gate pulse to gate lines of the liquid crystal display panel. Subpixels of the liquid crystal display panel include first and second subpixels positioned adjacent to each other in a horizontal direction. Each of the first and second subpixels is successively charged to the data voltages of two colors.

11 Claims, 12 Drawing Sheets

☐ : White gray level
▨ : Black gray level

☐ : White gray level
▨ : Black gray level

LIQUID CRYSTAL DISPLAY

This application claims the benefit of the Korean Patent Application No. 10-2010-0072333, filed in Korea on Jul. 27, 2010, which are hereby incorporated by reference as if fully set forth herein.

BACKGROUND

1. Field of the Invention

Exemplary embodiments of the invention relate to a liquid crystal display capable of improving image quality using a driving manner in which power consumption of source driver integrated circuits (ICs) is minimized and adjacent liquid crystal cells share the same data line.

2. Discussion of the Related Art

An active matrix type liquid crystal display displays a motion picture using thin film transistors (TFTs) as switching elements. The active matrix type liquid crystal display has been implemented in televisions as well as display devices for portable devices, such as office equipment and computers, because of the thin profile of the active matrix type liquid crystal displays. Accordingly, cathode ray tubes (CRTs) are being rapidly replaced by the active matrix type liquid crystal display.

The liquid crystal display includes a liquid crystal display panel, a backlight unit providing light to the liquid crystal display panel, source driver integrated circuits (ICs) for supplying a data voltage to data lines of the liquid crystal display panel, gate driver ICs for supplying a gate pulse (or a scan pulse) to gate lines (or scan lines) of the liquid crystal display panel, a control circuit for controlling the source driver ICs and the gate driver ICs, a light source driving circuit for driving light sources of the backlight unit, and the like.

With the rapid development of a process technique and a driving technique of the liquid crystal display, the manufacturing cost of the liquid crystal display has been reduced, and the image quality of the liquid crystal display has been greatly improved. A driving method, in which the number of data lines and the number of source driver ICs are reduced to ½ of the existing number by time-division supplying the data voltage to the liquid crystal cells adjacent to one another in a horizontal direction through one data line, has been recently applied. However, the driving method may generate a noise, such as transverse lines, longitudinal lines, and lattice patterns, in a display image because data charging characteristics of red (R), green (G), and blue (B) subpixels are different from one another or data charging characteristics of the subpixels of the same color are different from one another depending on a location of the liquid crystal display panel.

BRIEF SUMMARY

In one aspect, a liquid crystal display comprises a liquid crystal display panel including data lines whose a number is less than a horizontal resolution, gate lines crossing the data lines, and subpixels that are arranged in a matrix structure, each of the subpixels being successively charged to data voltages of different colors, a data driving circuit configured to convert digital video data into positive and negative data voltages, supply the positive and negative data voltages to the data lines, and cause the data voltages supplied to the same data line to have the same polarity during one frame period, a gate driving circuit configured to sequentially supply a gate pulse to the gate lines, and a timing controller configured to supply the digital video data to the data driving circuit and control an operation timing of each of the data driving circuit and the gate driving circuit.

The subpixels include first and second subpixels positioned adjacent to each other in a horizontal direction. The first subpixel is successively charged to the data voltages of two colors from an ith data line in response to a jth gate pulse, where and 'i' and 'j' are a natural number. The second subpixel is successively charged to the data voltages of two colors from the ith data line in response to a (j+1)th gate pulse.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE DRAWINGS AND THE PRESENTLY PREFERRED EMBODIMENTS

Figure 1:
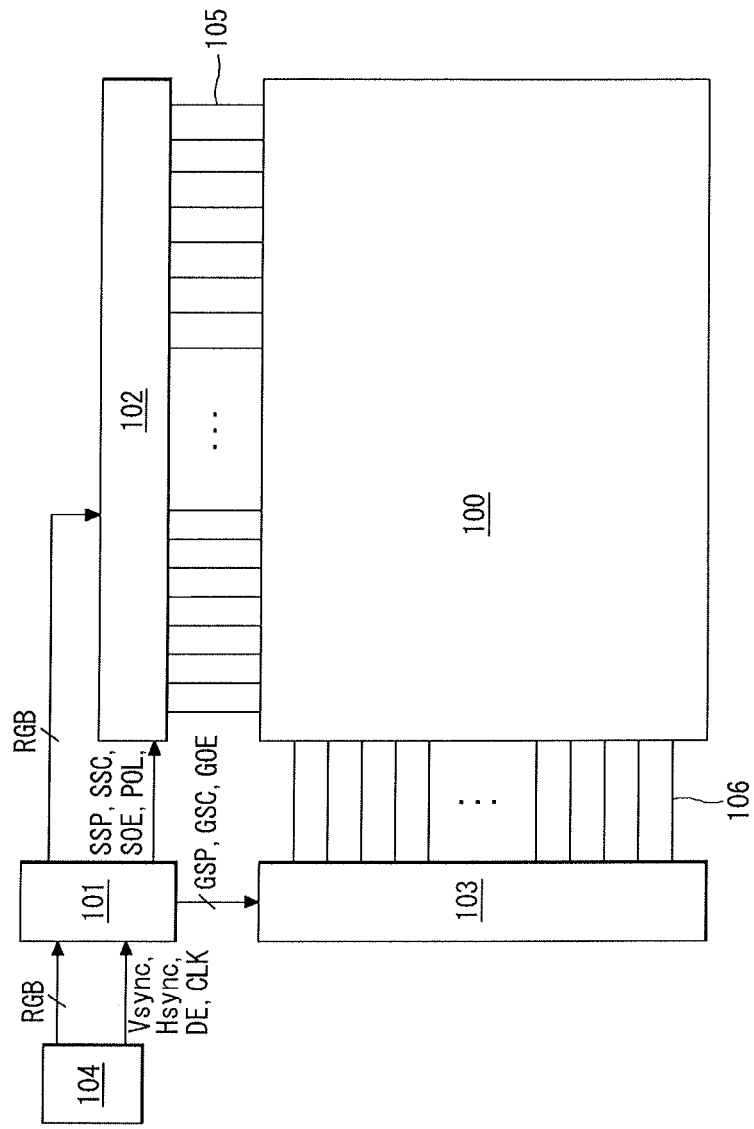
FIG. 1 is a block diagram of a liquid crystal display according to an exemplary embodiment of the invention.

The invention will be described more fully hereinafter with reference to the accompanying drawings, in which example embodiments of the inventions are shown. This invention may, however, be embodied in many different forms and should not be construed as limited to the embodiments set forth herein. Like reference numerals designate like elements throughout the specification. In the following description, if it is decided that the detailed description of known function or configuration related to the invention makes the subject matter of the invention unclear, the detailed description is omitted.

Reference will now be made in detail embodiments of the invention examples of which are illustrated in the accompanying drawings.

As shown in FIG. 1, a liquid crystal display according to an exemplary embodiment of the invention includes a liquid crystal display panel 100, a timing controller 101, a data driving circuit 102, and a gate driving circuit 103. A backlight unit for uniformly providing light to the liquid crystal display panel 100 may be positioned under the liquid crystal display panel 100. The backlight unit may be implemented as an edge type backlight unit or a direct type backlight unit.

The liquid crystal display panel 100 includes a thin film transistor (TFT) array substrate (referred to as a first substrate) and a color filter array substrate (referred to as a second substrate) that are positioned opposite each other with a liquid crystal layer interposed therebetween. A pixel array for displaying video data is formed on the liquid crystal display panel 100. As shown in FIGS. 2 to 7 and FIGS. 10 to 12, the pixel array includes pixels arranged in a matrix form based on a crossing structure of data lines 105 and gate lines 106, thereby displaying the video data. Each of the pixels includes red (R), green (G), and blue (B) subpixels. Adjacent subpixels share the same data line 105. Liquid crystal cells of the pixels display an image of the video data by adjusting a transmitted amount of light using a voltage difference between a data voltage applied to pixel electrodes and a common voltage applied to common electrodes. In a vertical electric field driving manner such as a twisted nematic (TN) mode and a vertical alignment (VA) mode, the common electrodes are formed on the color filter array substrate. In a horizontal electric field driving manner such as an in-plane switching (IPS) mode and a fringe field switching (FFS) mode, the common electrodes are formed on the TFT array substrate along with the pixel electrodes.

The data lines 105, the gate lines 106, TFTs, the pixel electrodes respectively connected to the TFTs, storage capacitors respectively connected to the pixel electrodes, and the like are formed on the TFT array substrate. Black matrixes, color filters, and the common electrodes are formed on the color filter array substrate. The common voltage is supplied to the common electrodes. Polarizing plates are respectively attached to the color filter array substrate and the TFT array substrate of the liquid crystal display panel 100. Alignment layers for setting a pre-tilt angle of liquid crystals are respectively formed on the color filter array substrate and the TFT array substrate.

The liquid crystal display panel 100 applicable to the exemplary embodiment of the invention may be implemented in any liquid crystal mode as well as the TN, VA, IPS, and FFS modes. The liquid crystal display according to the embodiment of the invention may be implemented as any type liquid crystal display including a backlit liquid crystal display, a transflective liquid crystal display, and a reflective liquid crystal display. A backlight unit is necessary in the backlit liquid crystal display and the transflective liquid crystal display. The backlight unit may be implemented as a direct type backlight unit or an edge type backlight unit.

The data driving circuit 102 includes a plurality of source driver integrated circuits (ICs). Output channels of the source driver ICs are respectively connected to the data lines 105 of the pixel array. Each of the source driver ICs receives digital video data from the timing controller 101. The source driver ICs convert the digital video data into positive and negative data voltages in response to a source timing control signal received from the timing controller 101. The source driver ICs then supply the positive and negative data voltages to the data lines 105 of the pixel array through the output channels of the source driver ICs. The source driver ICs supply the data voltages of opposite polarities to the adjacent data lines 105 under the control of the timing controller 101. The source driver ICs do not change a polarity of the data voltage supplied to each of the data lines 105 during one frame period and then invert the polarity of the data voltage supplied to each data line 105 in a next frame period. Thus, the source driver ICs do not change the polarities of the data voltages during one frame period and invert the polarities of the data voltages every one frame period in a column inversion scheme illustrated in FIG. 8.

The gate driving circuit 103 sequentially supplies a gate pulse to the gate lines 106 of the pixel array in response to a gate timing control signal received from the timing controller 101.

The timing controller 101 supplies the digital video data received from a system board 104 to the source driver ICs of the data driving circuit 102. The timing controller 101 generates the source timing control signal for controlling operation timing of the data driving circuit 102 and the gate timing control signal for controlling operation timing of the gate driving circuit 103.

Figure 2:
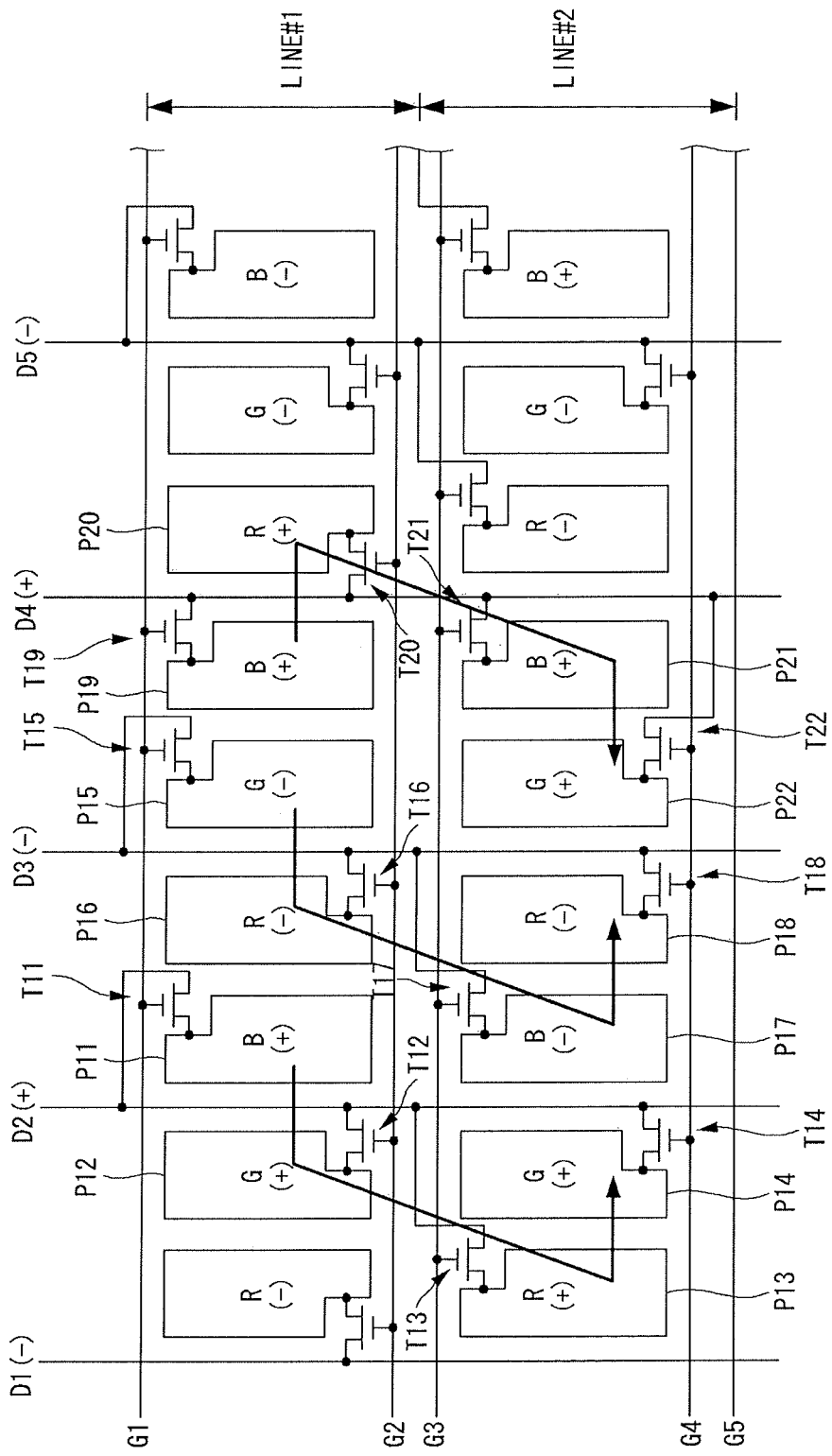
FIG. 2 is a circuit diagram of a first exemplary configuration of a pixel array.

FIG. 2 illustrates a first exemplary configuration of the pixel array. More specifically, FIG. 2 is a circuit diagram illustrating a part of the pixel array formed on the TFT array substrate.

As shown in FIG. 2, the pixel array includes the (m+1) data lines and the 2n gate lines at a resolution of 2m×n, where m and n are a natural number greater than 2. In FIG. 2, 2m is a horizontal resolution, and n is a vertical resolution. Each of horizontal display lines LINE#1 and LINE#2 of the pixel array includes 2m subpixels.

A first data line D1 is positioned at a left end of the pixel array, and a (m+1)th data line is a dummy data line positioned at a right end of the pixel array. The (m+1)th data line may be connected to the first data line D1 and may be directly connected to a dummy output channel of the source driver IC.

Two gate lines are formed parallel to each other between the horizontal display lines LINE#1 and LINE#2 of the pixel array. The liquid crystal cells of the subpixels positioned at left and right sides of one data line are sequentially charged to the data voltages supplied through the one data line.

The pixel array includes first to twelfth subpixels. Each subpixel of the pixel array is successively charged to the data voltages of two colors having the same polarity. More specifically, each subpixel of the pixel array is pre-charged to the data voltage of a first color and then is charged to the data voltage of a second color to be represented. In the embodiment of the invention, an R subpixel indicates a liquid crystal cell charged to a red data voltage, a G subpixel indicates a liquid crystal cell charged to a green data voltage, and a B subpixel indicates a liquid crystal cell charged to a blue data voltage. In FIG. 2, an arrow indicates a charging order of the data voltage.

The first to fourth subpixels are sequentially charged to the data voltages of the same polarity supplied through an ith data line, where 'i' is a natural number equal to or greater than 2 and less than 'm'. More specifically, the liquid crystal cell of the first subpixel is charged to the data voltage from the ith data line in response to a jth gate pulse, where 'j' is a natural number equal to or less than 'n'. The liquid crystal cell of the second subpixel is charged to the data voltage from the ith data line in response to a (j+1)th gate pulse. The liquid crystal cell of the third subpixel is charged to the data voltage from the ith data line in response to a (j+2)th gate pulse. The liquid crystal cell of the fourth subpixel is charged to the data voltage from the ith data line in response to a (j+3)th gate pulse. The first and second subpixels are the subpixels positioned on the left and right sides of the ith data line in a kth display line, where k is a natural number. In the first exemplary configuration of the pixel array illustrated in FIG. 2, the first subpixel is the B subpixel positioned on the right side of a second data line D2 in the first display line LINE#1 and includes a first TFT T11 and a first pixel electrode P11. The first TFT T11 supplies the data voltage from the second data line D2 to the first pixel electrode P11 in response to a first gate pulse supplied through a first gate line G1. The first TFT T11 includes a gate electrode connected to the first gate line G1, a drain electrode connected to the second data line D2, and a source electrode connected to the first pixel electrode P11. The second subpixel is the G subpixel positioned on the left side of the second data line D2 in the first display line LINE#1 and includes a second TFT T12 and a second pixel electrode P12. The second TFT T12 supplies the data voltage from the second data line D2 to the second pixel electrode P12 in response to a second gate pulse supplied through a second gate line G2. The second TFT T12 includes a gate electrode connected to the second gate line G2, a drain electrode connected to the second data line D2, and a source electrode connected to the second pixel electrode P12. The third and fourth subpixels are the subpixels positioned between an (i−1)th data line and the ith data line in a (k+1)th display line. In the first exemplary configuration of the pixel array illustrated in FIG. 2, the third subpixel is the R subpixel positioned on the right side of the first data line D1 in the second display line LINE#2 and includes a third TFT T13 and a third pixel electrode P13. The third TFT T13 supplies the data voltage from the second data line D2 to the third pixel electrode P13 in response to a third gate pulse supplied through a third gate line G3. The third TFT T13 includes a gate electrode connected to the third gate line G3, a drain electrode connected to the second data line D2, and a source electrode connected to the third pixel electrode P13. The drain electrode of the third TFT T13 passes between the second and third gate lines G2 and G3 and extends to the second data line D2, so as to prevent a reduction in an aperture ratio. The fourth subpixel is the G subpixel positioned on the left side of the second data line D2 in the second display line LINE#2 and includes a fourth TFT T14 and a fourth pixel electrode P14. The fourth TFT T14 supplies the data voltage from the second data line D2 to the fourth pixel electrode P14 in response to a fourth gate pulse supplied through a fourth gate line G4. The fourth TFT T14 includes a gate electrode connected to the fourth gate line G4, a drain electrode connected to the second data line D2, and a source electrode connected to the fourth pixel electrode P14.

The fifth to eighth subpixels are sequentially charged to the data voltages of the same polarity supplied through an (i+1)th data line. The fifth and sixth subpixels are the subpixels positioned on the left and right sides of the (i+1)th data line in the first display line LINE#1. In the first exemplary configuration of the pixel array illustrated in FIG. 2, the fifth subpixel is the G subpixel positioned on the right side of a third data line D3 in the first display line LINE#1 and includes a fifth TFT T15 and a fifth pixel electrode P15. The fifth TFT T15 supplies the data voltage from the third data line D3 to the fifth pixel electrode P15 in response to the first gate pulse supplied through the first gate line G1. The fifth TFT T15 includes a gate electrode connected to the first gate line G1, a drain electrode connected to the third data line D3, and a source electrode connected to the fifth pixel electrode P15. The sixth subpixel is the R subpixel positioned on the left side of the third data line D3 in the first display line LINE#1 and includes a sixth TFT T16 and a sixth pixel electrode P16. The sixth TFT T16 supplies the data voltage from the third data line D3 to the sixth pixel electrode P16 in response to the second gate pulse supplied through the second gate line G2. The sixth TFT T16 includes a gate electrode connected to the second gate line G2, a drain electrode connected to the third data line D3, and a source electrode connected to the sixth pixel electrode P16. The seventh and eighth subpixels are the subpixels positioned between the ith data line and the (i+1)th data line in the second display line LINE#2. The seventh subpixel is the B subpixel positioned on the right side of the second data line D2 in the second display line LINE#2 and includes a seventh TFT T17 and a seventh pixel electrode P17. The seventh TFT T17 supplies the data voltage from the third data line D3 to the seventh pixel electrode P17 in response to the third gate pulse supplied through the third gate line G3. The seventh TFT T17 includes a gate electrode connected to the third gate line G3, a drain electrode connected to the third data line D3, and a source electrode connected to the seventh pixel electrode P17. The drain electrode of the seventh TFT T17 passes between the second and third gate lines G2 and G3 and extends to the third data line D3, so as to prevent a reduction in the aperture ratio. The eighth subpixel is the R subpixel positioned on the left side of the third data line D3 in the second display line LINE#2 and includes an eighth TFT T18 and an eighth pixel electrode P18. The eighth TFT T18 supplies the data voltage from the third data line D3 to the eighth pixel electrode P18 in response to the fourth gate pulse supplied through the fourth gate line G4. The eighth TFT T18 includes a gate electrode connected to the fourth gate line G4, a drain electrode connected to the third data line D3, and a source electrode connected to the eighth pixel electrode P18.

The ninth to twelfth subpixels are sequentially charged to the data voltages of the same polarity supplied through an (i+2)th data line. The ninth and tenth subpixels are the subpixels positioned on the left and right sides of the (i+2)th data line in the first display line LINE#1. In the first exemplary configuration of the pixel array illustrated in FIG. 2, the ninth subpixel is the B subpixel positioned on the left side of a fourth data line D4 in the first display line LINE#1 and includes a ninth TFT T19 and a ninth pixel electrode P19. The ninth TFT T19 supplies the data voltage from the fourth data line D4 to the ninth pixel electrode P19 in response to the first gate pulse supplied through the first gate line G1. The ninth TFT T19 includes a gate electrode connected to the first gate line G1, a drain electrode connected to the fourth data line D4, and a source electrode connected to the ninth pixel electrode P19. The tenth subpixel is the R subpixel positioned on the right side of the fourth data line D4 in the first display line LINE#1 and includes a tenth TFT T20 and a tenth pixel electrode P20. The tenth TFT T20 supplies the data voltage from the fourth data line D4 to the tenth pixel electrode P20 in response to the second gate pulse supplied through the second gate line G2. The tenth TFT T20 includes a gate electrode connected to the second gate line G2, a drain electrode connected to the fourth data line D4, and a source electrode connected to the tenth pixel electrode P20. The eleventh and twelfth subpixels are the subpixels positioned between the (i+1)th data line and the (i+2)th data line in the second display line LINE#2. The eleventh subpixel is the B subpixel positioned on the left side of the fourth data line D4 in the second display line LINE#2 and includes an eleventh TFT T21 and an eleventh pixel electrode P21. The eleventh TFT T21 supplies the data voltage from the fourth data line D4 to the eleventh pixel electrode P21 in response to the third gate pulse supplied through the third gate line G3. The eleventh TFT T21 includes a gate electrode connected to the third gate line G3, a drain electrode connected to the fourth data line D4, and a source electrode connected to the eleventh pixel electrode P21. The twelfth subpixel is the G subpixel positioned on the right side of the third data line D3 in the second display line LINE#2 and includes a twelfth TFT T22 and an twelfth pixel electrode P22. The twelfth TFT T22 supplies the data voltage from the fourth data line D4 to the twelfth pixel electrode P22 in response to the fourth gate pulse supplied through the fourth gate line G4. The twelfth TFT T22 includes a gate electrode connected to the fourth gate line G4, a drain electrode connected to the fourth data line D4, and a source electrode connected to the twelfth pixel electrode P22. The drain electrode of the twelfth TFT T22 passes between the fourth and fifth gate lines G4 and G5 and extends to the fourth data line D4, so as to prevent a reduction in the aperture ratio.

During a frame period when the negative data voltage is supplied to the odd-numbered data lines D1, D3, and D5 and the positive data voltage is supplied to the even-numbered data lines D2 and D4, the first to fourth subpixels are sequentially charged to the positive data voltage from the second data line D2. The fifth to eighth subpixels are sequentially charged to the negative data voltage from the third data line D3. The ninth to twelfth subpixels are sequentially charged to the positive data voltage from the fourth data line D4.

FIGS. 3 to 7 illustrate various charging characteristics of the pixel array shown in FIG. 2.

Figure 3:
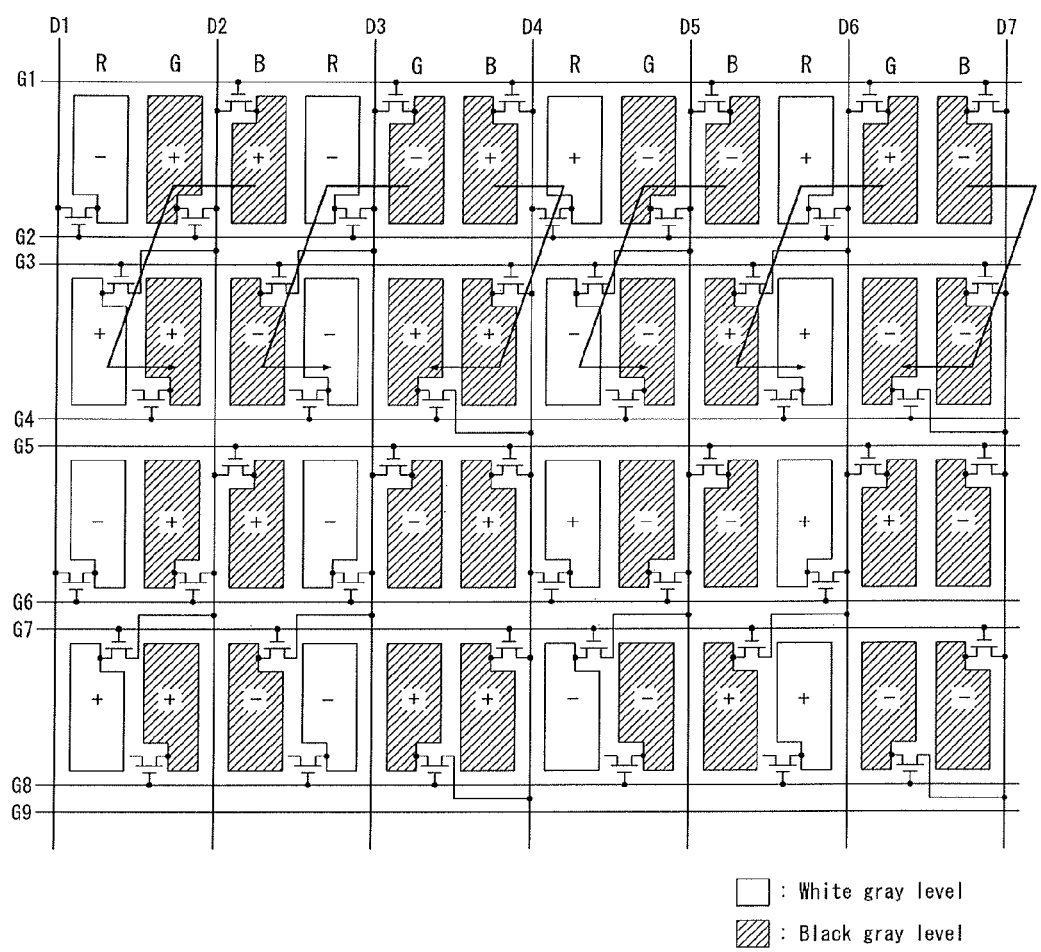
FIGS. 3 to 7 illustrate examples of displaying various test image on the pixel array shown in FIG. 2.
Figure 4:
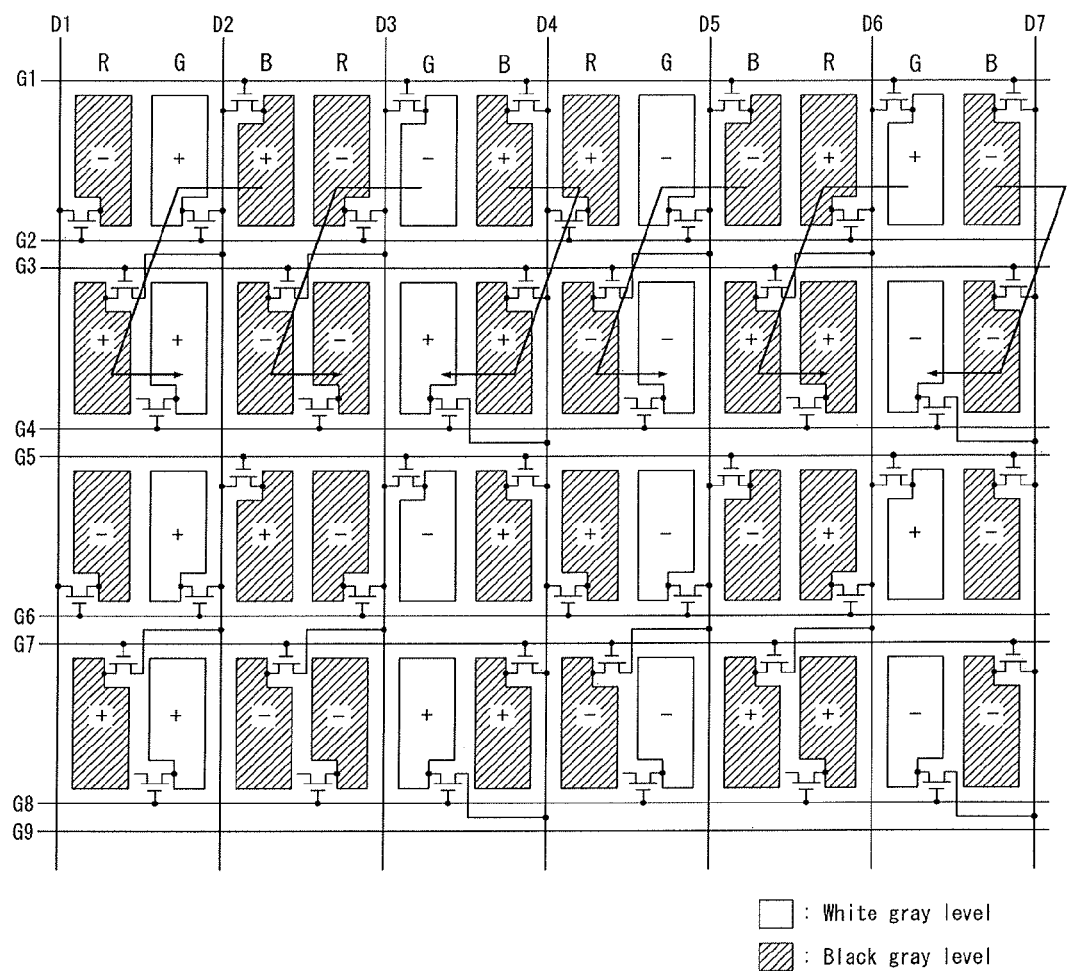
Figure 5:
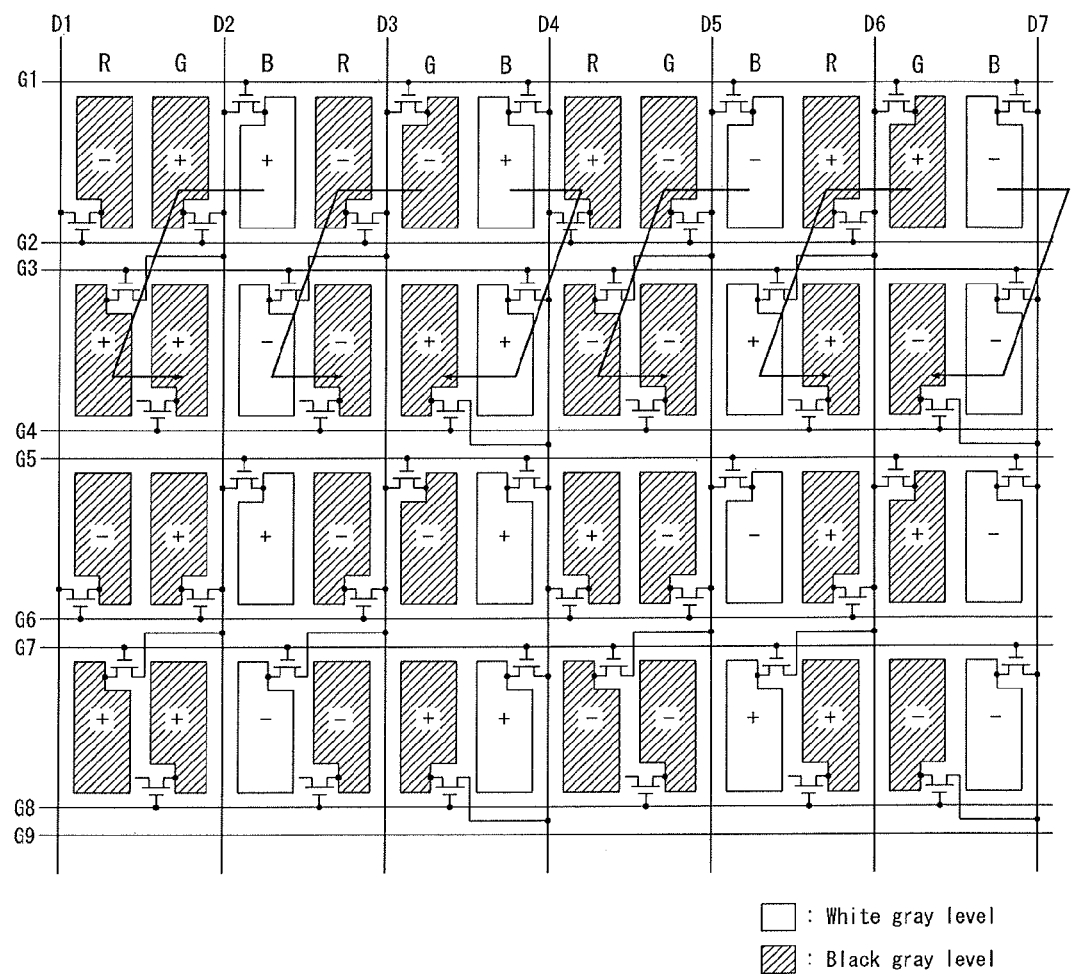
Figure 6:
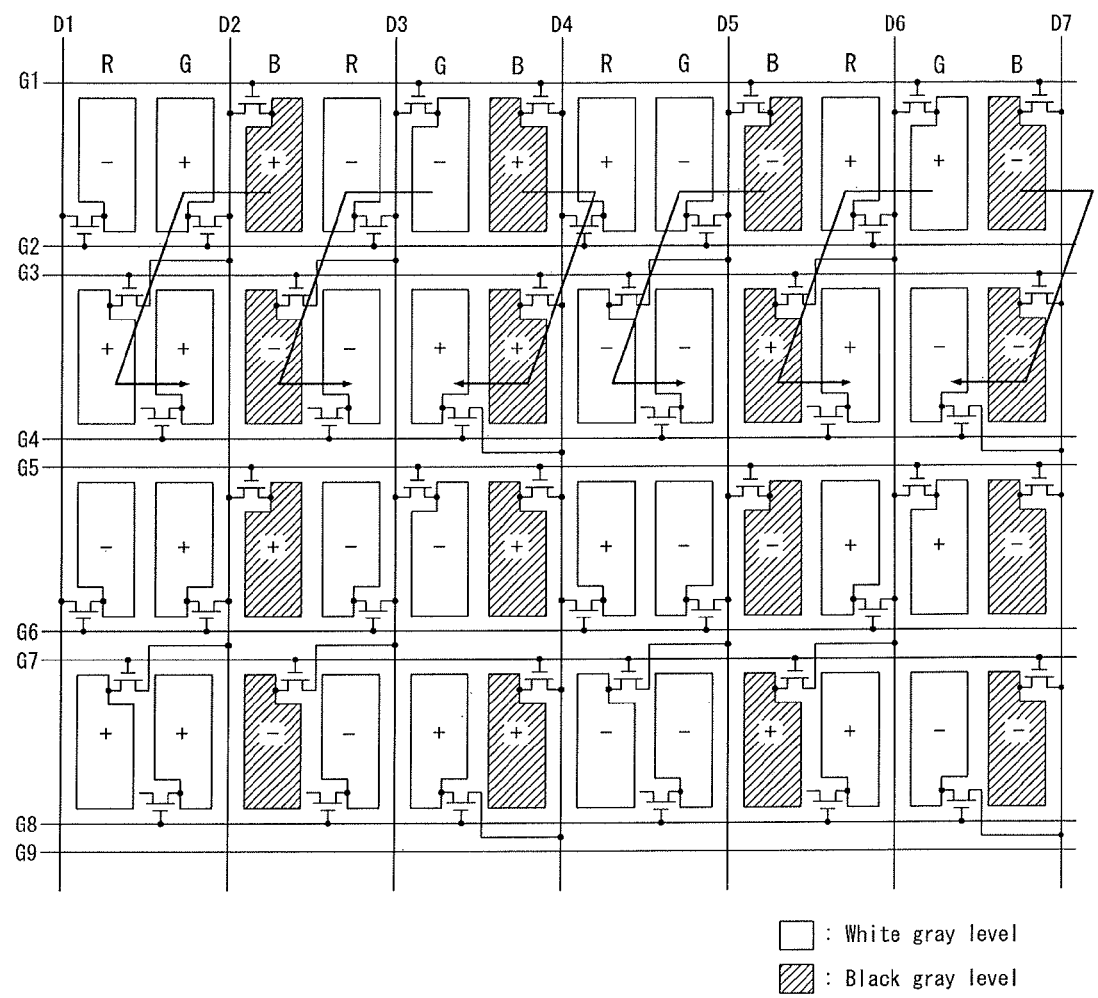
Figure 7:
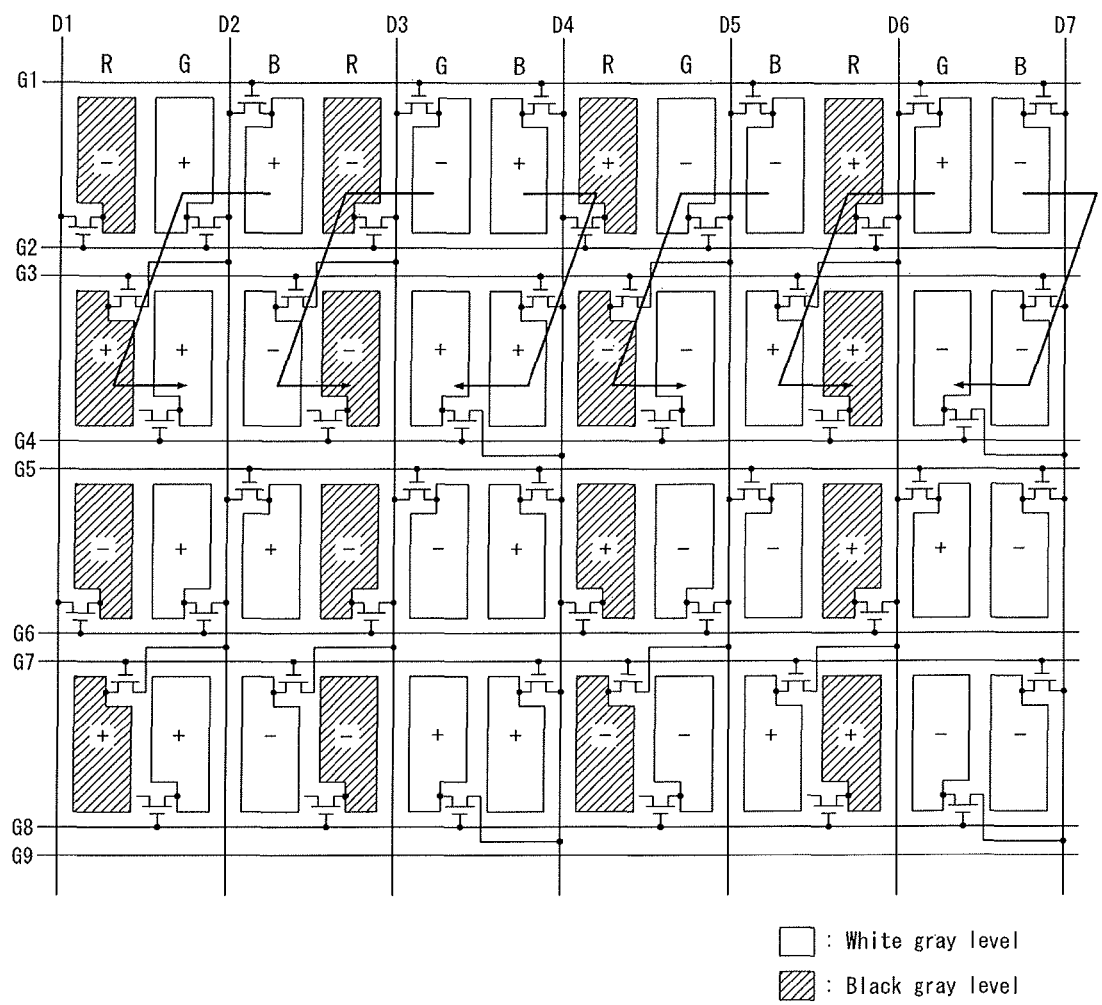

FIG. 3 illustrates an example of displaying a red test image on the pixel array when the data voltage of a white gray level is supplied to the R subpixels and the data voltage of a black gray level is supplied to the G and B subpixels. FIG. 4 illustrates an example of displaying a green test image on the pixel array when the data voltage of the white gray level is supplied to the G subpixels and the data voltage of the black gray level is supplied to the R and B subpixels. FIG. 5 illustrates an example of displaying a blue test image on the pixel array when the data voltage of the white gray level is supplied to the B subpixels and the data voltage of the black gray level is supplied to the R and G subpixels. FIG. 6 illustrates an example of displaying a yellow test image on the pixel array when the data voltage of the white gray level is supplied to the R and G subpixels and the data voltage of the black gray level is supplied to the B subpixels. FIG. 7 illustrates an example of displaying a cyan test image on the pixel array when the data voltage of the white gray level is supplied to the B and G subpixels and the data voltage of the black gray level is supplied to the R subpixels.

As shown in FIGS. 3 to 7, the liquid crystal display according to the exemplary embodiment of the invention does not successively supply the data voltages of the same color to the pixel array and sequentially supplies the data voltages of different colors to the pixel array, thereby causing the R, G, and B subpixels to have the same data charging characteristics in any circumstances. Further, as shown in FIGS. 8 and 9, in any circumstances, the liquid crystal display according to the exemplary embodiment of the invention pre-charges each of the R, G, and B subpixels to the data voltage of color different from color to be represented and then charges each of the R, G, and B subpixels to the data voltage of the color to be represented.

Figure 8:
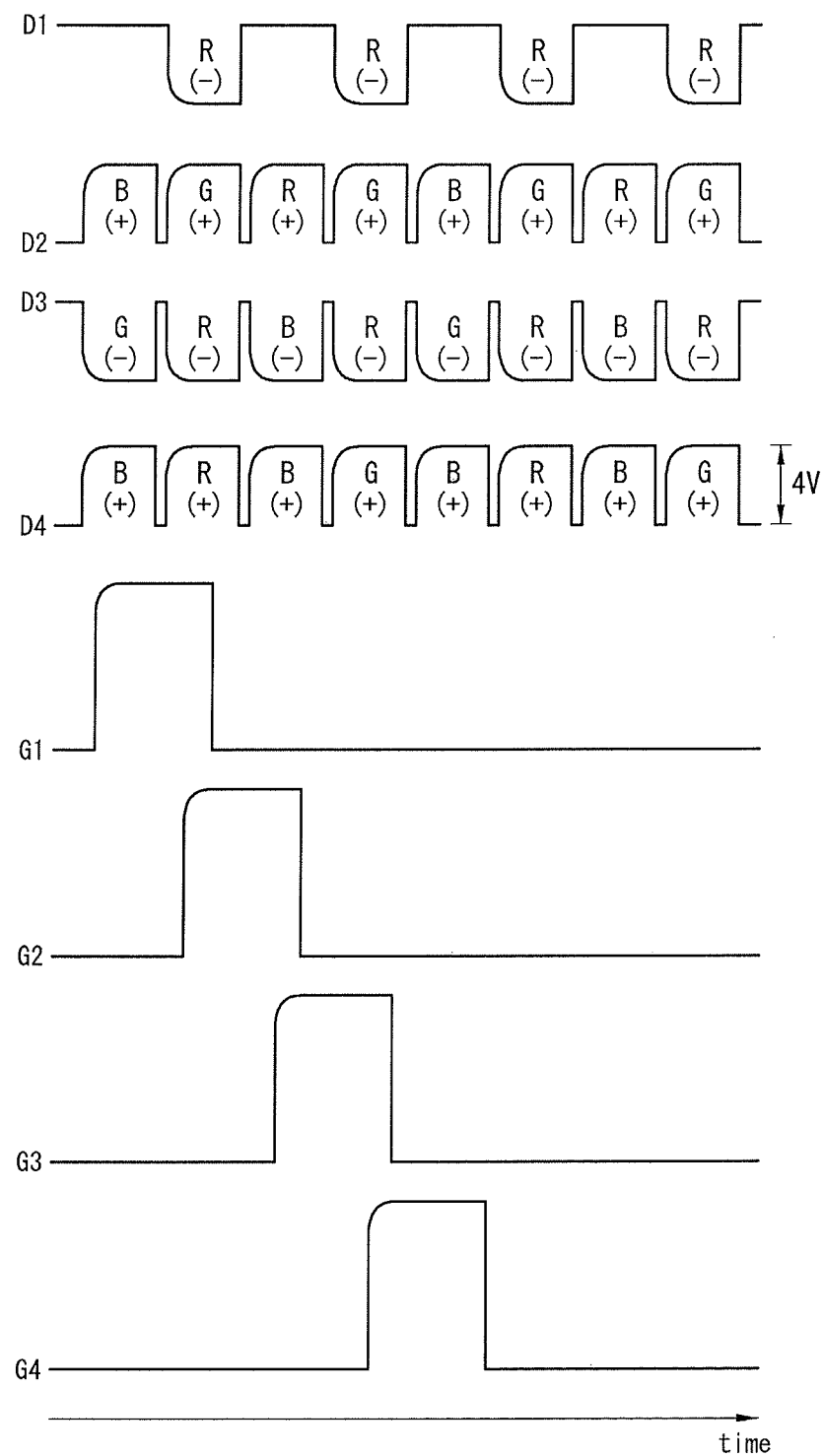
FIG. 8 is a waveform diagram illustrating a driving waveform of a liquid crystal display according to an exemplary embodiment of the invention.

In FIG. 8, D1 to D4 indicate the data voltages supplied to the first to fourth data lines D1 to D4, and G1 to G4 indicate the gate pulses sequentially supplied to the first to fourth gate lines G1 to G4. The two successively generated gate pulses overlap each other during a predetermined period of time, so as to sufficiently secure a charging time of the liquid crystal cells. For example, a front part of the second gate pulse overlaps a rear part of the first gate pulse, and a front part of the third gate pulse overlaps a rear part of the second gate pulse.

Figure 9:
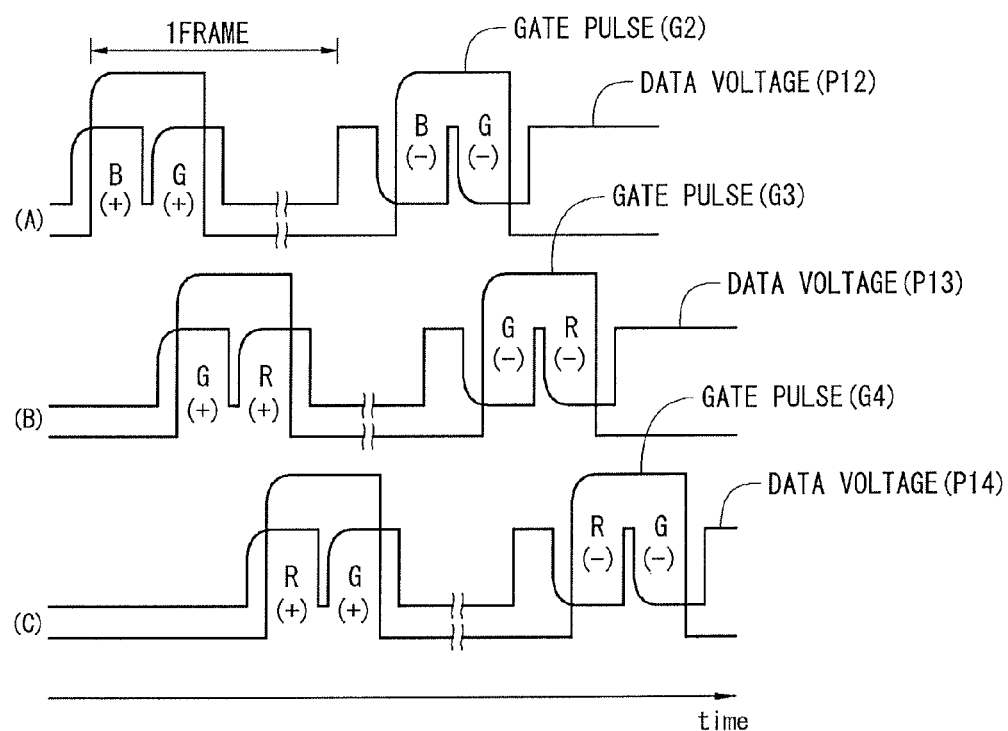
FIG. 9 illustrates data charging characteristics of second to fourth subpixels shown in FIG. 2.

In FIG. 9, (A) indicates the data voltage charged to the pixel electrode P12 of the second subpixel. In FIG. 2, (B) indicates the data voltage charged to the pixel electrode P13 of the third subpixel. In FIG. 2, (C) indicates the data voltage charged to the pixel electrode P14 of the fourth subpixel shown in FIG. 2. The second subpixel is pre-charged to the blue data voltage at the same time when the first subpixel is charged to the blue data voltage, and then is charged to the green data voltage to be represented. The third subpixel is pre-charged to the green data voltage at the same time when the second subpixel is charged to the green data voltage, and then is charged to the red data voltage to be represented. The fourth subpixel is pre-charged to the red data voltage at the same time when the third subpixel is charged to the red data voltage, and then is charged to the green data voltage to be represented. As shown in FIG. 9, when each of the subpixels is successively charged to the data voltages of the same polarity, the charging of each subpixel to the data voltage can be sufficient. In any circumstances, each subfield is pre-charged to the data voltage of color different from color to be represented and then is charged to the data voltage of the color to be represented. Thus, the charging operation of each subpixel to the data voltage is performed, so that all the subpixels of the pixel array have the same charging characteristics even if any image is input.

Because the source driver ICs according to the embodiment of the invention output only the data voltages of the same polarity during one frame period, the output voltage of the source driver ICs is as small as 3V to 4V as shown in FIG. 8. On the other hand, because the related art source driver ICs repeatedly output the positive data voltage and the negative voltage during one frame period, the output voltage of the related art source driver ICs is more than twice the output voltage of the source driver ICs according to the embodiment of the invention. Further, in the liquid crystal display according to the embodiment of the invention, the number of data lines and the number of source driver ICs are reduced to ½ of the related art at the same resolution. Thus, in the following Equation (1) defining power consumption, the number N of output channels of the source driver ICs and the data voltage Veff in the exemplary embodiment of the invention may be reduced compared with the related art. As a result, the power consumption of the source driver ICs according to the embodiment of the invention may be reduced to ½ of the power consumption of the related art source driver ICs.

$$P = 2\pi f \times N \times C \times V_{eff}^2 \tag{1}$$

In the above Equation (1), P is power consumption of the source driver ICs, f is a frequency of the data voltage, and C is capacitance of the data lines.

Figure 10:
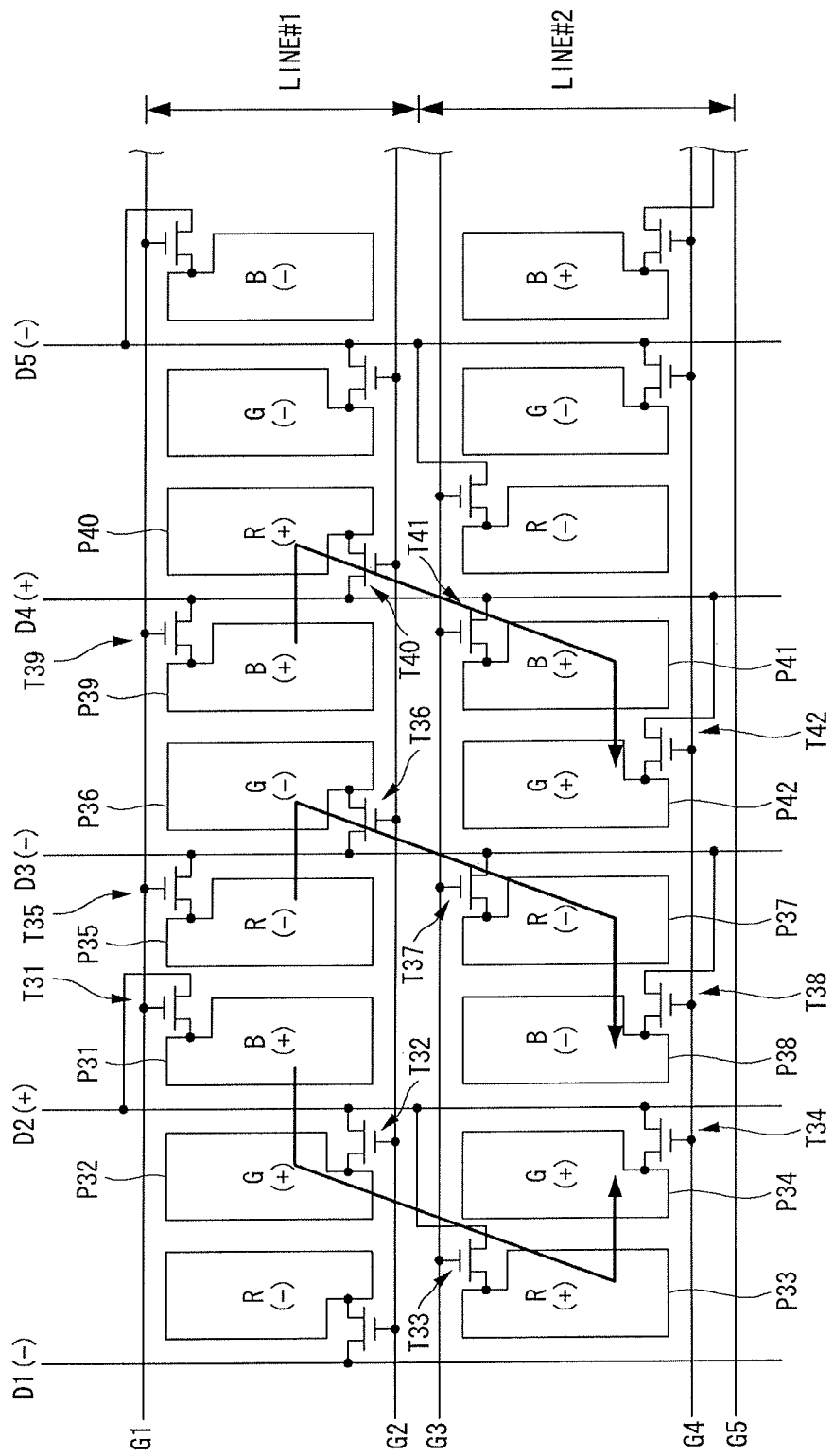
FIG. 10 is a circuit diagram of a second exemplary configuration of a pixel array.
Figure 11:
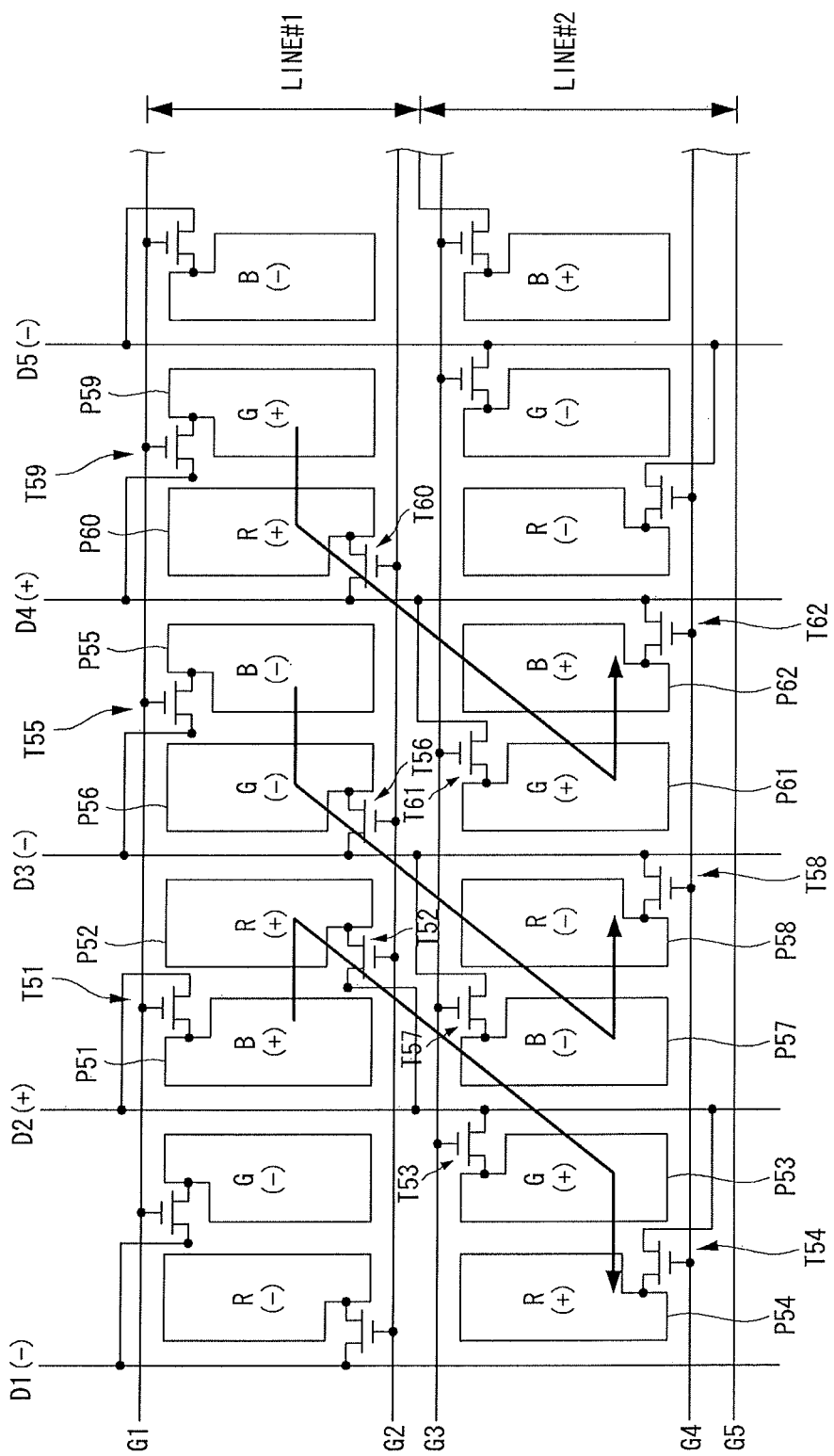
FIG. 11 is a circuit diagram of a third exemplary configuration of a pixel array.
Figure 12:
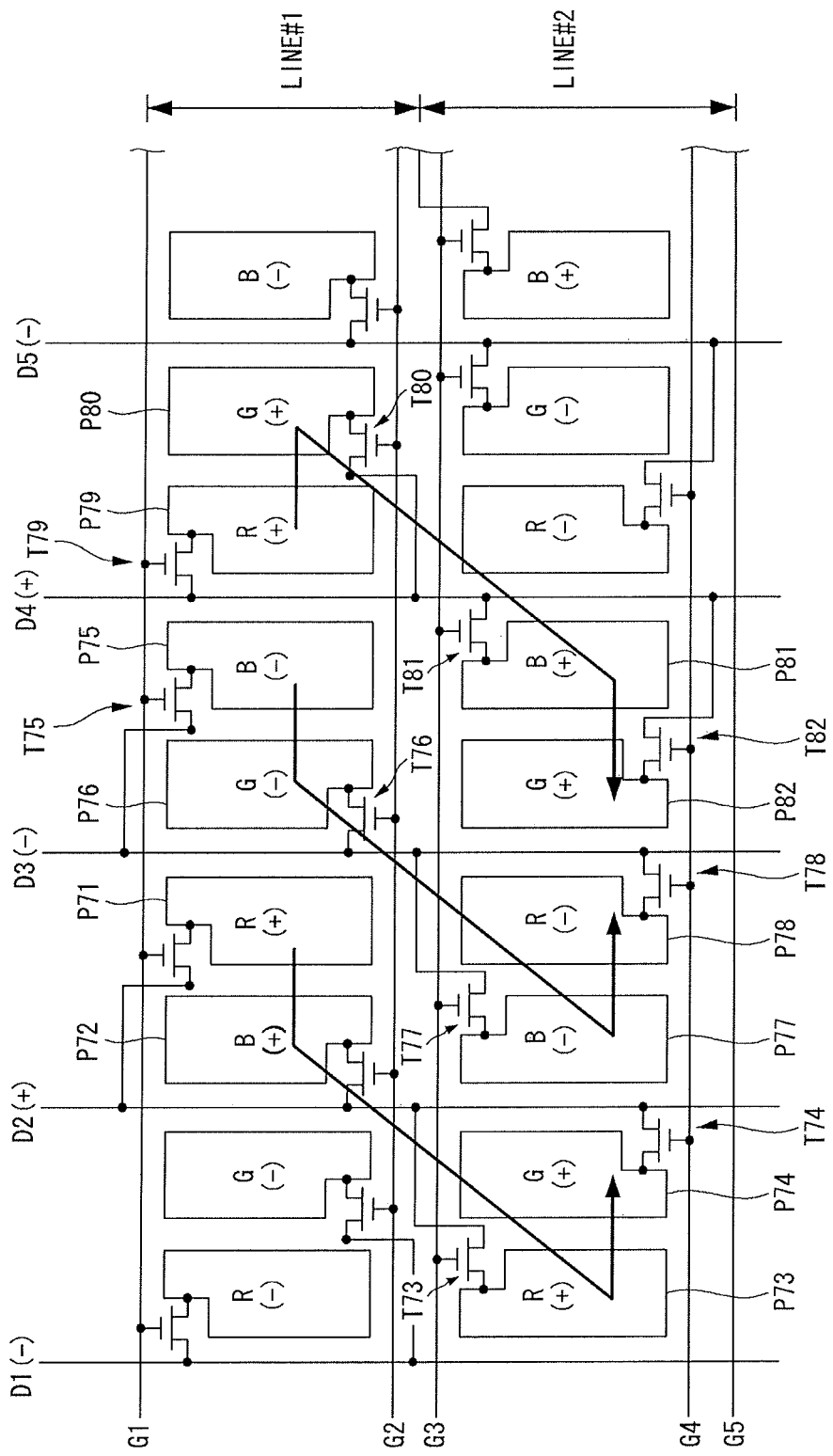
FIG. 12 is a circuit diagram of a fourth exemplary configuration of a pixel array.

The pixel array shown in FIG. 2 may have various configurations illustrated in FIGS. 10 to 12. The pixel arrays illustrated in FIGS. 10 to 12 may obtain substantially the same effect as the pixel array shown in FIG. 2.

FIG. 10 is a circuit diagram of a second exemplary configuration of the pixel array.

As shown in FIG. 10, the pixel array according to the embodiment of the invention includes first to twelfth subpixels.

Since configurations of the first to fourth subpixels, and the ninth to twelfth subpixels illustrated in FIG. 10 are substantially the same as FIG. 2, a further description may be briefly made or may be entirely omitted.

The fifth to eighth subpixels are sequentially charged to the data voltages of the same polarity supplied through the (i+1) th data line. The fifth and sixth subpixels are the subpixels positioned on the left and right sides of the (i+1)th data line in the first display line LINE#1. In the second exemplary embodiment of the pixel array illustrated in FIG. 10, the fifth subpixel is the R subpixel positioned on the left side of the third data line D3 in the first display line LINE#1 and includes a fifth TFT T35 and a fifth pixel electrode P35. The fifth TFT T35 supplies the data voltage from the third data line D3 to the fifth pixel electrode P35 in response to the first gate pulse supplied through the first gate line G1. The fifth TFT T35 includes a gate electrode connected to the first gate line G1, a drain electrode connected to the third data line D3, and a source electrode connected to the fifth pixel electrode P35. The sixth subpixel is the G subpixel positioned on the right side of the third data line D3 in the first display line LINE#1 and includes a sixth TFT T36 and a sixth pixel electrode P36. The sixth TFT T36 supplies the data voltage from the third data line D3 to the sixth pixel electrode P36 in response to the second gate pulse supplied through the second gate line G2. The sixth TFT T36 includes a gate electrode connected to the second gate line G2, a drain electrode connected to the third data line D3, and a source electrode connected to the sixth pixel electrode P36. The seventh and eighth subpixels are the subpixels positioned between the ith data line and the (i+1)th data line in the second display line LINE#2. The seventh subpixel is the R subpixel positioned on the left side of the third data line D3 in the second display line LINE#2 and includes a seventh TFT T37 and a seventh pixel electrode P37. The seventh TFT T37 supplies the data voltage from the third data line D3 to the seventh pixel electrode P37 in response to the third gate pulse supplied through the third gate line G3. The seventh TFT T37 includes a gate electrode connected to the third gate line G3, a drain electrode connected to the third data line D3, and a source electrode connected to the seventh pixel electrode P37. The eighth subpixel is the B subpixel positioned on the right side of the second data line D2 in the second display line LINE#2 and includes an eighth TFT T38 and an eighth pixel electrode P38. The eighth TFT T38 supplies the data voltage from the third data line D3 to the eighth pixel electrode P38 in response to the fourth gate pulse supplied through the fourth gate line G4. The eighth TFT T38 includes a gate electrode connected to the fourth gate line G4, a drain electrode connected to the third data line D3, and a source electrode connected to the eighth pixel electrode P38. The drain electrode of the eighth TFT T38 passes between the fourth and fifth gate lines G4 and G5 and extends to the third data line D3.

During a frame period when the negative data voltage is supplied to the odd-numbered data lines D1, D3, and D5 and the positive data voltage is supplied to the even-numbered data lines D2 and D4, the first to fourth subpixels are sequentially charged to the positive data voltage from the second data line D2. The fifth to eighth subpixels are sequentially charged to the negative data voltage from the third data line D3. The ninth to twelfth subpixels are sequentially charged to the positive data voltage from the fourth data line D4.

FIG. 11 is a circuit diagram of a third exemplary configuration of the pixel array.

As shown in FIG. 11, the pixel array according to the embodiment of the invention includes first to twelfth subpixels.

The first to fourth subpixels are sequentially charged to the data voltages of the same polarity supplied through the ith data line. The first and second subpixels are the subpixels positioned adjacent to each other in a horizontal direction between the ith data line and the (i+1)th data line in the first display line LINE#1. In the third exemplary configuration of the pixel array illustrated in FIG. 11, the first subpixel is the B subpixel positioned on the right side of the second data line D2 in the first display line LINE#1 and includes a first TFT T51 and a first pixel electrode P51. The first TFT T51 supplies the data voltage from the second data line D2 to the first pixel electrode P51 in response to the first gate pulse supplied through the first gate line G1. The first TFT T51 includes a gate electrode connected to the first gate line G1, a drain electrode connected to the second data line D2, and a source electrode connected to the first pixel electrode P51. The second subpixel is the R subpixel positioned on the left side of the third data line D3 in the first display line LINE#1 and includes a second TFT T52 and a second pixel electrode P52. The second TFT T52 supplies the data voltage from the second data line D2 to the second pixel electrode P52 in response to the second gate pulse supplied through the second gate line G2. The second TFT T52 includes a gate electrode connected to the second gate line G2, a drain electrode connected to the second data line D2, and a source electrode connected to the second pixel electrode P52. The third and fourth subpixels are the subpixels positioned between the (i−1)th data line and the ith data line in the second display line LINE#2. The third subpixel is the G subpixel positioned on the left side of the second data line D2 in the second display line LINE#2 and includes a third TFT T53 and a third pixel electrode P53. The third TFT T53 supplies the data voltage from the second data line D2 to the third pixel electrode P53 in response to the third gate pulse supplied through the third gate line G3. The third TFT T53 includes a gate electrode connected to the third gate line G3, a drain electrode connected to the second data line D2, and a source electrode connected to the third pixel electrode P53. The fourth subpixel is the R subpixel positioned on the right side of the first data line D1 in the second display line LINE#2 and includes a fourth TFT T54 and a fourth pixel electrode P54. The fourth TFT T54 supplies the data voltage from the second data line D2 to the fourth pixel electrode P54 in response to the fourth gate pulse supplied through the fourth gate line G4. The fourth TFT T54 includes a gate electrode connected to the fourth gate line G4, a drain electrode connected to the second data line D2, and a source electrode connected to the fourth pixel electrode P54.

The fifth to eighth subpixels are sequentially charged to the data voltages of the same polarity supplied through the (i+1)th data line. The fifth and sixth subpixels are the subpixels positioned adjacent to each other in the horizontal direction between the (i+1)th data line and the (i+2)th data line in the first display line LINE#1. In the third exemplary configuration of the pixel array illustrated in FIG. 11, the fifth subpixel is the B subpixel positioned on the left side of the fourth data line D4 in the first display line LINE#1 and includes a fifth TFT T55 and a fifth pixel electrode P55. The fifth TFT T55 supplies the data voltage from the third data line D3 to the fifth pixel electrode P55 in response to the first gate pulse supplied through the first gate line G1. The fifth TFT T55 includes a gate electrode connected to the first gate line G1, a drain electrode connected to the third data line D3, and a source electrode connected to the fifth pixel electrode P55. The sixth subpixel is the G subpixel positioned on the right side of the third data line D3 in the first display line LINE#1 and includes a sixth TFT T56 and a sixth pixel electrode P56. The sixth TFT T56 supplies the data voltage from the third data line D3 to the sixth pixel electrode P56 in response to the second gate pulse supplied through the second gate line G2. The sixth TFT T56 includes a gate electrode connected to the second gate line G2, a drain electrode connected to the third data line D3, and a source electrode connected to the sixth pixel electrode P56. The seventh and eighth subpixels are the subpixels positioned between the ith data line and the (i+1)th data line in the second display line LINE#2. The seventh subpixel is the B subpixel positioned on the right side of the second data line D2 in the second display line LINE#2 and includes a seventh TFT T57 and a seventh pixel electrode P57. The seventh TFT T57 supplies the data voltage from the third data line D3 to the seventh pixel electrode P57 in response to the third gate pulse supplied through the third gate line G3. The seventh TFT T57 includes a gate electrode connected to the third gate line G3, a drain electrode connected to the third data line D3, and a source electrode connected to the seventh pixel electrode P57. The eighth subpixel is the R subpixel positioned on the left side of the third data line D3 in the second display line LINE#2 and includes an eighth TFT T58 and an eighth pixel electrode P58. The eighth TFT T58 supplies the data voltage from the third data line D3 to the eighth pixel electrode P58 in response to the fourth gate pulse supplied through the fourth gate line G4. The eighth TFT T58 includes a gate electrode connected to the fourth gate line G4, a drain electrode connected to the third data line D3, and a source electrode connected to the eighth pixel electrode P58.

The ninth to twelfth subpixels are sequentially charged to the data voltages of the same polarity supplied through the (i+2)th data line. The ninth and tenth subpixels are the subpixels positioned adjacent to each other in the horizontal direction between the (i+2)th data line and an (i+3)th data line in the first display line LINE#1. In the third exemplary configuration of the pixel array illustrated in FIG. 11, the ninth subpixel is the G subpixel positioned on the left side of a fifth data line D5 in the first display line LINE#1 and includes a ninth TFT T59 and a ninth pixel electrode P59. The ninth TFT T59 supplies the data voltage from the fourth data line D4 to the ninth pixel electrode P59 in response to the first gate pulse supplied through the first gate line G1. The ninth TFT T59 includes a gate electrode connected to the first gate line G1, a drain electrode connected to the fourth data line D4, and a source electrode connected to the ninth pixel electrode P59. The tenth subpixel is the R subpixel positioned on the right side of the fourth data line D4 in the first display line LINE#1 and includes a tenth TFT T60 and a tenth pixel electrode P60. The tenth TFT T60 supplies the data voltage from the fourth data line D4 to the tenth pixel electrode P60 in response to the second gate pulse supplied through the second gate line G2. The tenth TFT T60 includes a gate electrode connected to the second gate line G2, a drain electrode connected to the fourth data line D4, and a source electrode connected to the tenth pixel electrode P60. The eleventh and twelfth subpixels are the subpixels positioned between the (i+1)th data line and the (i+2)th data line in the second display line LINE#2. The eleventh subpixel is the G subpixel positioned on the right side of the third data line D3 in the second display line LINE#2 and includes an eleventh TFT T61 and an eleventh pixel electrode P61. The eleventh TFT T61 supplies the data voltage from the fourth data line D4 to the eleventh pixel electrode P61 in response to the third gate pulse supplied through the third gate line G3. The eleventh TFT T61 includes a gate electrode connected to the third gate line G3, a drain electrode connected to the fourth data line D4, and a source electrode connected to the eleventh pixel electrode P61. The twelfth subpixel is the B subpixel positioned on the left side of the fourth data line D4 in the second display line LINE#2 and includes a twelfth TFT T62 and an twelfth pixel electrode P62. The twelfth TFT T62 supplies the data voltage from the fourth data line D4 to the twelfth pixel electrode P62 in response to the fourth gate pulse supplied through the fourth gate line G4. The twelfth TFT T62 includes a gate electrode connected to the fourth gate line G4, a drain electrode connected to the fourth data line D4, and a source electrode connected to the twelfth pixel electrode P62.

During a frame period when the negative data voltage is supplied to the odd-numbered data lines D1, D3, and D5 and the positive data voltage is supplied to the even-numbered data lines D2 and D4, the first to fourth subpixels are sequentially charged to the positive data voltage from the second data line D2. The fifth to eighth subpixels are sequentially charged to the negative data voltage from the third data line D3. The ninth to twelfth subpixels are sequentially charged to the positive data voltage from the fourth data line D4.

FIG. 12 is a circuit diagram of a fourth exemplary configuration of the pixel array.

As shown in FIG. 12, the pixel array according to the embodiment of the invention includes first to twelfth subpixels.

Since configurations of the fifth to eighth subpixels illustrated in FIG. 12 are substantially the same as FIG. 11, a further description may be briefly made or may be entirely omitted.

The first to fourth subpixels are sequentially charged to the data voltages of the same polarity supplied through the ith data line. The first and second subpixels are the subpixels positioned adjacent to each other in the horizontal direction between the ith data line and the (i+1)th data line in the first display line LINE#1. In the fourth exemplary configuration of the pixel array illustrated in FIG. 12, the first subpixel is the R subpixel positioned on the left side of the third data line D3 in the first display line LINE#1 and includes a first TFT T71 and a first pixel electrode P71. The first TFT T71 supplies the data voltage from the second data line D2 to the first pixel electrode P71 in response to the first gate pulse supplied through the first gate line G1. The first TFT T71 includes a gate electrode connected to the first gate line G1, a drain electrode connected to the second data line D2, and a source electrode connected to the first pixel electrode P71. The second subpixel is the B subpixel positioned on the right side of the second data line D2 in the first display line LINE#1 and includes a second TFT T72 and a second pixel electrode P72. The second TFT T72 supplies the data voltage from the second data line D2 to the second pixel electrode P72 in response to the second gate pulse supplied through the second gate line G2. The second TFT T72 includes a gate electrode connected to the second gate line G2, a drain electrode connected to the second data line D2, and a source electrode connected to the second pixel electrode P72. The third and fourth subpixels are the subpixels positioned between the (i−1)th data line and the ith data line in the second display line LINE#2. The third subpixel is the R subpixel positioned on the right side of the first data line D1 in the second display line LINE#2 and includes a third TFT T73 and a third pixel electrode P73. The third TFT T73 supplies the data voltage from the second data line D2 to the third pixel electrode P73 in response to the third gate pulse supplied through the third gate line G3. The third TFT T73 includes a gate electrode connected to the third gate line G3, a drain electrode connected to the second data line D2, and a source electrode connected to the third pixel electrode P73. The fourth subpixel is the G subpixel positioned on the left side of the second data line D2 in the second display line LINE#2 and includes a fourth TFT T74 and a fourth pixel electrode P74. The fourth TFT T74 supplies the data voltage from the second data line D2 to the fourth pixel electrode P74 in response to the fourth gate pulse supplied through the fourth gate line G4. The fourth TFT T74 includes a gate electrode connected to the fourth gate line G4, a drain electrode connected to the second data line D2, and a source electrode connected to the fourth pixel electrode P74.

The ninth to twelfth subpixels are sequentially charged to the data voltages of the same polarity supplied through the (i+2)th data line. The ninth and tenth subpixels are the subpixels positioned adjacent to each other in the horizontal direction between the (i+2)th data line and the (i+3)th data line in the first display line LINE#1. In the fourth exemplary configuration of the pixel array illustrated in FIG. 12, the ninth subpixel is the R subpixel positioned on the right side of the fourth data line D4 in the first display line LINE#1 and includes a ninth TFT T79 and a ninth pixel electrode P79. The ninth TFT T79 supplies the data voltage from the fourth data line D4 to the ninth pixel electrode P79 in response to the first gate pulse supplied through the first gate line G1. The ninth TFT T79 includes a gate electrode connected to the first gate line G1, a drain electrode connected to the fourth data line D4, and a source electrode connected to the ninth pixel electrode P79. The tenth subpixel is the G subpixel positioned on the left side of the fifth data line D5 in the first display line LINE#1 and includes a tenth TFT T80 and a tenth pixel electrode P80. The tenth TFT T80 supplies the data voltage from the fourth data line D4 to the tenth pixel electrode P80 in response to the second gate pulse supplied through the second gate line G2. The tenth TFT T80 includes a gate electrode connected to the second gate line G2, a drain electrode connected to the fourth data line D4, and a source electrode connected to the tenth pixel electrode P80. The eleventh and twelfth subpixels are the subpixels positioned between the (i+1)th data line and the (i+2)th data line in the second display line LINE#2. The eleventh subpixel is the B subpixel positioned on the left side of the fourth data line D4 in the second display line LINE#2 and includes an eleventh TFT T81 and an eleventh pixel electrode P61. The eleventh TFT T81 supplies the data voltage from the fourth data line D4 to the eleventh pixel electrode P81 in response to the third gate pulse supplied through the third gate line G3. The eleventh TFT T81 includes a gate electrode connected to the third gate line G3, a drain electrode connected to the fourth data line D4, and a source electrode connected to the eleventh pixel electrode P81. The twelfth subpixel is the G subpixel positioned on the right side of the third data line D3 in the second display line LINE#2 and includes a twelfth TFT T82 and an twelfth pixel electrode P82. The twelfth TFT T82 supplies the data voltage from the fourth data line D4 to the twelfth pixel electrode P82 in response to the fourth gate pulse supplied through the fourth gate line G4. The twelfth TFT T82 includes a gate electrode connected to the fourth gate line G4, a drain electrode connected to the fourth data line D4, and a source electrode connected to the twelfth pixel electrode P82.

During a frame period when the negative data voltage is supplied to the odd-numbered data lines D1, D3, and D5 and the positive data voltage is supplied to the even-numbered data lines D2 and D4, the first to fourth subpixels are sequentially charged to the positive data voltage from the second data line D2. The fifth to eighth subpixels are sequentially charged to the negative data voltage from the third data line D3. The ninth to twelfth subpixels are sequentially charged to the positive data voltage from the fourth data line D4.

As described above, the liquid crystal display according to the exemplary embodiment of the invention includes the pixel array having the structure, in which the two subpixels positioned adjacent to each other in the horizontal direction share one data line, thereby causing the polarities of the data voltages to be the same as one another during one frame period. Furthermore, the liquid crystal display according to the exemplary embodiment of the invention supplies the data voltages of two colors to each subpixel, thereby causing the data charging characteristics of all of the subpixels to be the same as one another. As a result, power consumption of the source driver ICs can be minimized, and the image quality of the liquid crystal display can be improved.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A liquid crystal display comprising:
a liquid crystal display panel including data lines, which number less than a horizontal resolution, gate lines crossing the data lines, and subpixels that are arranged in a matrix structure, each of the subpixels being successively charged to data voltages of different colors;
a data driving circuit configured to convert digital video data into positive and negative data voltages, supply the positive and negative data voltages to the data lines, and cause the data voltages supplied to the same data line to have the same polarity during one frame period;
a gate driving circuit configured to sequentially supply a gate pulse to the gate lines; and
a timing controller configured to supply the digital video data to the data driving circuit and control an operation timing of each of the data driving circuit and the gate driving circuit,
wherein the subpixels include first and second subpixels positioned adjacent to each other in a first row, and third and fourth subpixels positioned adjacent to each other in a second row, one of the third and fourth subpixels being positioned adjacent to one of the first and second subpixels in a column direction, two gate lines extending between the one of the first and second subpixels and the one of the third and fourth subpixels,
wherein the first subpixel is successively charged to the data voltages of two different colors having the same polarity from an ith data line in response to a jth gate pulse, where 'i' and 'j' are a natural number,
wherein the second subpixel is successively charged to the data voltages of two different colors having the same polarity from the ith data line in response to a (j+1)th gate pulse, and the third and fourth subpixels are connected to the ith data line,
wherein a drain electrode of a thin film transistor (TFT) in the other one of the third and fourth subpixels crosses over one of the two gate lines and is connected to the ith data line at a position between the two gate lines, and
wherein the first, second, third and fourth sub-pixels are connected to the same ith data line and are connected to a ith gate line, a (j+1) gate line, a (i+2) gate line, and a (j+3) gate line, respectively, the first and second subpixels are disposed on opposing sides of the ith date line with the ith date line extending therebetween, and the third and fourth subpixels are disposed at one side of the ith data line with no data line extending therebetween.

2. The liquid crystal display of claim 1, wherein a number of gate lines is greater than a vertical resolution of the liquid crystal display panel,
wherein a pair of gate lines are positioned between horizontal display lines of the liquid crystal display panel.

3. The liquid crystal display of claim 1, wherein the first subpixel is positioned on the right side of the ith data line in a kth display line of the liquid crystal display panel, where 'k' is a natural number, and includes a first thin film transistor (TFT) successively supplying the data voltages of two colors from the ith data line to a first pixel electrode in response to the jth gate pulse,
wherein the second subpixel is positioned on the left side of the ith data line in the kth display line of the liquid crystal display panel and includes a second TFT successively supplying the data voltages of two colors from the ith data line to a second pixel electrode in response to the (j+1)th gate pulse.

4. The liquid crystal display of claim 3, wherein
the third subpixel that is positioned on the right side of an (i−1)th data line in a (k+1)th display line and is successively charged to the data voltages of two colors from the ith data line in response to a (j+2)th gate pulse;
the fourth subpixel that is positioned on the left side of the ith data line in the (k+1)th display line and is successively charged to the data voltages of two colors from the ith data line in response to a (j+3)th gate pulse;
the subpixels further include:
a fifth subpixel that is positioned on the right side of an (i+1)th data line in the kth display line and is successively charged to the data voltages of two colors from the (i+1)th data line in response to the jth gate pulse;
a sixth subpixel that is positioned on the left side of the (i+1)th data line in the kth display line and is successively charged to the data voltages of two colors from the (i+1)th data line in response to the (j+1)th gate pulse;
a seventh subpixel that is positioned on the right side of the ith data line in the (k+1)th display line and is successively charged to the data voltages of two colors from the (i+1)th data line in response to the (j+2)th gate pulse;
an eighth subpixel that is positioned on the left side of the (i+1)th data line in the (k+1)th display line and is successively charged to the data voltages of two colors from the (i+1)th data line in response to the (j+3)th gate pulse;
a ninth subpixel that is positioned on the left side of an (i+2)th data line in the kth display line and is successively charged to the data voltages of two colors from the (i+2)th data line in response to the jth gate pulse;
a tenth subpixel that is positioned on the right side of the (i+2)th data line in the kth display line and is successively charged to the data voltages of two colors from the (i+2)th data line in response to the (j+2)th gate pulse;
an eleventh subpixel that is positioned on the left side of the (i+2)th data line in the (k+1)th display line and is successively charged to the data voltages of two colors from the (i+2)th data line in response to the (j+2)th gate pulse; and
a twelfth subpixel that is positioned on the right side of the (i+1)th data line in the (k+1)th display line and is successively charged to the data voltages of two colors from the (i+2)th data line in response to the (j+3)th gate pulse.

5. The liquid crystal display of claim 4, wherein the third subpixel includes a third TFT successively supplying the data voltages from the ith data line to a third pixel electrode in response to the (j+2)th gate pulse,
wherein the fourth subpixel includes a fourth TFT successively supplying the data voltages from the ith data line to a fourth pixel electrode in response to the (j+3)th gate pulse,
wherein the fifth subpixel includes a fifth TFT successively supplying the data voltages from the (i+1)th data line to a fifth pixel electrode in response to the jth gate pulse,
wherein the sixth subpixel includes a sixth TFT successively supplying the data voltages from the (i+1)th data line to a sixth pixel electrode in response to the (j+1)th gate pulse,
wherein the seventh subpixel includes a seventh TFT successively supplying the data voltages from the (i+1)th data line to a seventh pixel electrode in response to the (j+2)th gate pulse,
wherein the eighth subpixel includes an eighth TFT successively supplying the data voltages from the (i+1)th data line to an eighth pixel electrode in response to the (j+3)th gate pulse,
wherein the ninth subpixel includes a ninth TFT successively supplying the data voltages from the (i+2)th data line to a ninth pixel electrode in response to the jth gate pulse,
wherein the tenth subpixel includes a tenth TFT successively supplying the data voltages from the (i+2)th data line to a tenth pixel electrode in response to the (j+1)th gate pulse,
wherein the eleventh subpixel includes an eleventh TFT successively supplying the data voltages from the (i+2)th data line to an eleventh pixel electrode in response to the (j+2)th gate pulse, and
wherein the twelfth subpixel includes a twelfth TFT successively supplying the data voltages from the (i+2)th data line to a twelfth pixel electrode in response to the (j+3)th gate pulse.

6. The liquid crystal display of claim 3, wherein the subpixels further include:
a third subpixel that is positioned on the right side of an (i−1)th data line in a (k+1)th display line and is successively charged to the data voltages of two colors from the ith data line in response to a (j+2)th gate pulse;
a fourth subpixel that is positioned on the left side of the ith data line in the (k+1)th display line and is successively charged to the data voltages of two colors from the ith data line in response to a (j+3)th gate pulse;
a fifth subpixel that is positioned on the left side of an (i+1)th data line in the kth display line and is successively charged to the data voltages of two colors from the (i+1)th data line in response to the jth gate pulse;
a sixth subpixel that is positioned on the right side of the (i+1)th data line in the kth display line and is successively charged to the data voltages of two colors from the (i+1)th data line in response to the (j+1)th gate pulse;
a seventh subpixel that is positioned on the left side of the (i+1)th data line in the (k+1)th display line and is successively charged to the data voltages of two colors from the (i+1)th data line in response to the (j+2)th gate pulse;
an eighth subpixel that is positioned on the right side of the ith data line in the (k+1)th display line and is successively charged to the data voltages of two colors from the (i+1)th data line in response to the (j+3)th gate pulse;
a ninth subpixel that is positioned on the left side of an (i+2)th data line in the kth display line and is successively charged to the data voltages of two colors from the (i+2)th data line in response to the jth gate pulse;
a tenth subpixel that is positioned on the right side of the (i+2)th data line in the kth display line and is successively charged to the data voltages of two colors from the (i+2)th data line in response to the (j+1)th gate pulse;
an eleventh subpixel that is positioned on the left side of the (i+2)th data line in the (k+1)th display line and is successively charged to the data voltages of two colors from the (i+2)th data line in response to the (j+2)th gate pulse; and
a twelfth subpixel that is positioned on the right side of the (i+1)th data line in the (k+1)th display line and is successively charged to the data voltages of two colors from the (i+2)th data line in response to the (j+3)th gate pulse.

7. The liquid crystal display of claim 6, wherein the third subpixel includes a third TFT successively supplying the data voltages from the ith data line to a third pixel electrode in response to the (j+2)th gate pulse,
wherein the fourth subpixel includes a fourth TFT successively supplying the data voltages from the ith data line to a fourth pixel electrode in response to the (j+3)th gate pulse, wherein the fifth subpixel includes a fifth TFT successively supplying the data voltages from the (i+1)th data line to a fifth pixel electrode in response to the jth gate pulse, wherein the sixth subpixel includes a sixth TFT successively supplying the data voltages from the (i+1)th data line to a sixth pixel electrode in response to the (j+1)th gate pulse, wherein the seventh subpixel includes a seventh TFT successively supplying the data voltages from the (i+1)th data line to a seventh pixel electrode in response to the (j+2)th gate pulse, wherein the eighth subpixel includes an eighth TFT successively supplying the data voltages from the (i+1)th data line to an eighth pixel electrode in response to the (j+3)th gate pulse, wherein the ninth subpixel includes a ninth TFT successively supplying the data voltages from the (i+2)th data line to a ninth pixel electrode in response to the jth gate pulse, wherein the tenth subpixel includes a tenth TFT successively supplying the data voltages from the (i+2)th data line to a tenth pixel electrode in response to the (j+1)th gate pulse, wherein the eleventh subpixel includes an eleventh TFT successively supplying the data voltages from the (i+2)th data line to an eleventh pixel electrode in response to the (j+2)th gate pulse, and wherein the twelfth subpixel includes a twelfth TFT successively supplying the data voltages from the (i+2)th data line to a twelfth pixel electrode in response to the (j+3)th gate pulse.

8. The liquid crystal display of claim 1, wherein the first subpixel is positioned on the right side of the ith data line in a kth display line of the liquid crystal display panel, where 'k' is a natural number, and includes a first thin film transistor (TFT) successively supplying the data voltages of two colors from the ith data line to a first pixel electrode in response to the jth gate pulse, wherein the second subpixel is positioned on the left side of an (i+1)th data line in the kth display line of the liquid crystal display panel and includes a second TFT successively supplying the data voltages of two colors from the ith data line to a second pixel electrode in response to the (j+1)th gate pulse.

9. The liquid crystal display of claim 8, wherein the subpixels further include:

a third subpixel that is positioned on the left side of the ith data line in a (k+1)th display line and is successively charged to the data voltages of two colors from the ith data line in response to a (j+2)th gate pulse;

a fourth subpixel that is positioned on the right side of an (i−1)th data line in the (k+1)th display line and is successively charged to the data voltages of two colors from the ith data line in response to a (j+3)th gate pulse;

a fifth subpixel that is positioned on the left side of an (i+2)th data line in the kth display line and is successively charged to the data voltages of two colors from the (i+1)th data line in response to the jth gate pulse;

a sixth subpixel that is positioned on the right side of the (i+1)th data line in the kth display line and is successively charged to the data voltages of two colors from the (i+1)th data line in response to the (j+1)th gate pulse;

a seventh subpixel that is positioned on the right side of the ith data line in the (k+1)th display line and is successively charged to the data voltages of two colors from the (i+1)th data line in response to the (j+2)th gate pulse;

an eighth subpixel that is positioned on the left side of the (i+1)th data line in the (k+1)th display line and is successively charged to the data voltages of two colors from the (i+1)th data line in response to the (j+3)th gate pulse;

a ninth subpixel that is positioned on the left side of an (i+3)th data line in the kth display line and is successively charged to the data voltages of two colors from the (i+2)th data line in response to the jth gate pulse;

a tenth subpixel that is positioned on the right side of the (i+2)th data line in the kth display line and is successively charged to the data voltages of two colors from the (i+2)th data line in response to the (j+1)th gate pulse;

an eleventh subpixel that is positioned on the right side of the (i+1)th data line in the (k+1)th display line and is successively charged to the data voltages of two colors from the (i+2)th data line in response to the (j+2)th gate pulse; and a twelfth subpixel that is positioned on the left side of the (i+2)th data line in the (k+1)th display line and is successively charged to the data voltages of two colors from the (i+2)th data line in response to the (j+3)th gate pulse.

10. The liquid crystal display of claim 1, wherein the first subpixel is positioned on the left side of an (i+1)th data line in a kth display line of the liquid crystal display panel, where 'k' is a natural number, and includes a TFT successively supplying the data voltages of two colors from the ith data line to a first pixel electrode in response to the jth gate pulse, wherein the second subpixel is positioned on the right side of the ith data line in the kth display line of the liquid crystal display panel and includes a second TFT successively supplying the data voltages of two colors from the ith data line to a second pixel electrode in response to the (j+1)th gate pulse.

11. The liquid crystal display of claim 10, wherein the subpixels further include:

a third subpixel that is positioned on the right side of an (i−1)th data line in a (k+1)th display line and is successively charged to the data voltages of two colors from the ith data line in response to a (j+2)th gate pulse;

a fourth subpixel that is positioned on the left side of the ith data line in the (k+1)th display line and is successively charged to the data voltages of two colors from the ith data line in response to a (j+3)th gate pulse;

a fifth subpixel that is positioned on the left side of an (i+2)th data line in the kth display line and is successively charged to the data voltages of two colors from the (i+1)th data line in response to the jth gate pulse;

a sixth subpixel that is positioned on the right side of the (i+1)th data line in the kth display line and is successively charged to the data voltages of two colors from the (i+1)th data line in response to the (j+1)th gate pulse;

a seventh subpixel that is positioned on the right side of the ith data line in the (k+1)th display line and is successively charged to the data voltages of two colors from the (i+1)th data line in response to the (j+2)th gate pulse;

an eighth subpixel that is positioned on the left side of the (i+1)th data line in the (k+1)th display line and is successively charged to the data voltages of two colors from the (i+1)th data line in response to the (j+3)th gate pulse;

a ninth subpixel that is positioned on the right side of the (i+2)th data line the left side of an (i+3)th data line in the kth display line and is successively charged to the data voltages of two colors from the (i+2)th data line in response to the jth gate pulse;

a tenth subpixel that is positioned on the left side of an (i+3)th data line in the kth display line and is successively charged to the data voltages of two colors from the (i+2)th data line in response to the (j+1)th gate pulse;

an eleventh subpixel that is positioned on the left side of the (i+2)th data line in the (k+1)th display line and is successively charged to the data voltages of two colors from the (i+2)th data line in response to the (j+2)th gate pulse; and a twelfth subpixel that is positioned on the right side of the (i+1)th data line in the (k+1)th display line and is successively charged to the data voltages of two colors from the (i+2)th data line in response to the (j+3)th gate pulse.

* * * * *